US009429293B2

(12) United States Patent
Williams et al.

(10) Patent No.: US 9,429,293 B2
(45) Date of Patent: Aug. 30, 2016

(54) VEHICLE LIGHT FIXTURE HAVING INTERNAL HEATSINK FOR LED LAMP

(71) Applicant: Ford Global Technologies, LLC, Dearborn, MI (US)

(72) Inventors: Bruce Preston Williams, Grosse Pointe Park, MI (US); Arun Kumar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 14/189,478

(22) Filed: Feb. 25, 2014

(65) Prior Publication Data

US 2015/0241018 A1 Aug. 27, 2015

(51) Int. Cl.
*B60Q 1/00* (2006.01)
*F21S 8/10* (2006.01)

(52) U.S. Cl.
CPC .......... *F21S 48/328* (2013.01); *F21S 48/1104* (2013.01); *F21S 48/115* (2013.01); *F21S 48/1154* (2013.01); *F21S 48/1208* (2013.01); *F21S 48/211* (2013.01); *F21S 48/215* (2013.01); *F21S 48/2206* (2013.01); *F21S 48/321* (2013.01)

(58) Field of Classification Search
CPC ..................... G02F 1/133617; G02F 1/13362; G02F 1/1336; G02F 1/133621; G02F 2001/133614; G02F 2202/36; G02F 2203/34
USPC ............ 362/97.1, 97.2, 97.3, 547, 294, 546, 362/548
See application file for complete search history.

(56) References Cited

U.S. PATENT DOCUMENTS

| | | | | |
|---|---|---|---|---|
| 5,808,402 | A * | 9/1998 | Seiler | H01J 5/60 313/25 |
| 7,237,936 | B1 * | 7/2007 | Gibson | F21S 48/1154 362/294 |
| 8,314,559 | B1 | 11/2012 | Helms et al. | |
| 2015/0098235 | A1 * | 4/2015 | Singh | F21S 48/1159 362/516 |

FOREIGN PATENT DOCUMENTS

| | | | |
|---|---|---|---|
| CN | 102506367 | A | 6/2012 |
| DE | 202006009553 | U1 | 10/2006 |
| JP | 2010108637 | A | 5/2010 |
| JP | 2013152896 | A | 8/2013 |
| WO | 2013137493 | A1 | 9/2013 |

OTHER PUBLICATIONS

Marovic, "Thermal Simulation Solves Complexities of LED Headlight Designs," Automotive Engineering International Online, Oct. 11, 2013.

* cited by examiner

*Primary Examiner* — Anh Mai
*Assistant Examiner* — Glenn Zimmerman
(74) *Attorney, Agent, or Firm* — Jason Rogers; Price Heneveld LLP

(57) ABSTRACT

A vehicle headlight includes a headlight housing including an external lens and an outer wall that define a headlight interior and a lighting element including a light-emitting diode lamp and an internal heatsink coupled to at least a portion of the lamp. The lamp is in thermal communication with the internal heatsink. The lighting element is disposed within the headlight interior and coupled to an element receptacle defined by the outer wall. The internal heatsink of the lighting element is in thermal communication with the external lens.

20 Claims, 10 Drawing Sheets

First Named Inventor: Bruce Preston Williams
Atty. Docket No.: 83404776
Page 5 of 10

VEHICLE LIGHT FIXTURE HAVING INTERNAL HEATSINK FOR LED LAMP

FIELD OF THE INVENTION

The present invention generally relates to external vehicular lighting fixtures, more specifically, an external vehicular lighting fixture having an internal heatsink attached to a light-emitting diode (LED) lamp.

BACKGROUND OF THE INVENTION

Many vehicles include the use of LED lighting for headlamps and other signal lighting on the exterior of the vehicle. The use of LED lighting within these fixtures tends to generate large amounts of heat that require heatsinks to be attached in order to dissipate the heat generated when the LED fixture is in operation. Conventional heatsinks for LED fixtures include heatsinks that attach to the back of an LED fixture and project directly rearward of the LED fixture. LED fixtures having such a configuration can occupy significant amounts of space within the engine compartment and various body panels of the vehicle. Additionally, conventional heatsinks can provide little to no heat transfer from the LED fixture to the outer areas of the light fixture proximate the lens.

SUMMARY OF THE INVENTION

According to one aspect of the present invention, a vehicle headlight includes a headlight housing including an external lens and an outer wall that define a headlight interior. A lighting element includes a light-emitting diode lamp and an internal heatsink is coupled to at least a portion of the lamp. The lamp is in thermal communication with the internal heatsink. The lighting element is disposed within the headlight interior and coupled to an element receptacle defined by the outer wall. The internal heatsink of the lighting element is in thermal communication with the external lens.

According to another aspect of the present invention, a vehicle headlight includes an internal heatsink defining a lamp receptacle. A lamp is disposed within the lamp receptacle and is in thermal communication with the internal heatsink. A headlight housing includes an external lens and an outer wall that define an interior volume. The internal heatsink and lamp are disposed within the interior volume. The internal heatsink is in thermal communication with the external lens.

According to yet another aspect of the present invention, an external vehicle lamp includes a heatsink defining an element receptacle. A lamp is disposed within the element receptacle and is in thermal communication with the heatsink. A light housing includes a lens and an outer wall that define an interior volume. The heatsink and lamp are disposed within the interior volume, wherein the heatsink is in thermal communication with the lens.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
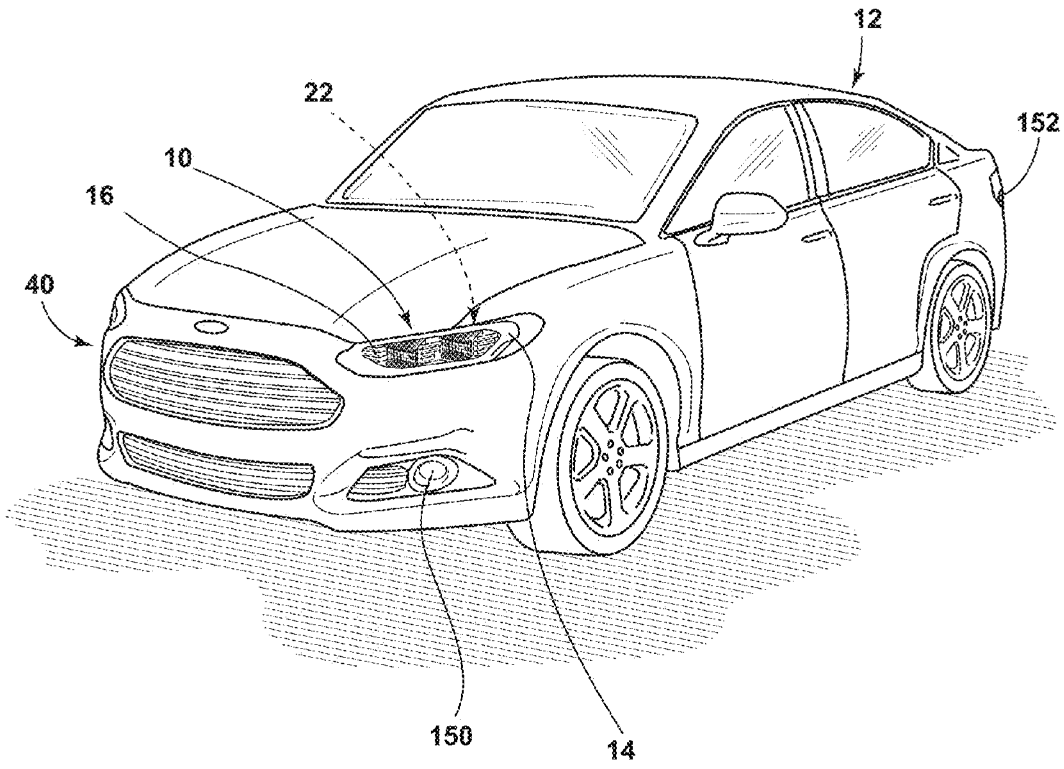
FIG. 1 is a front perspective view of a vehicle with an embodiment of the vehicle lighting element installed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
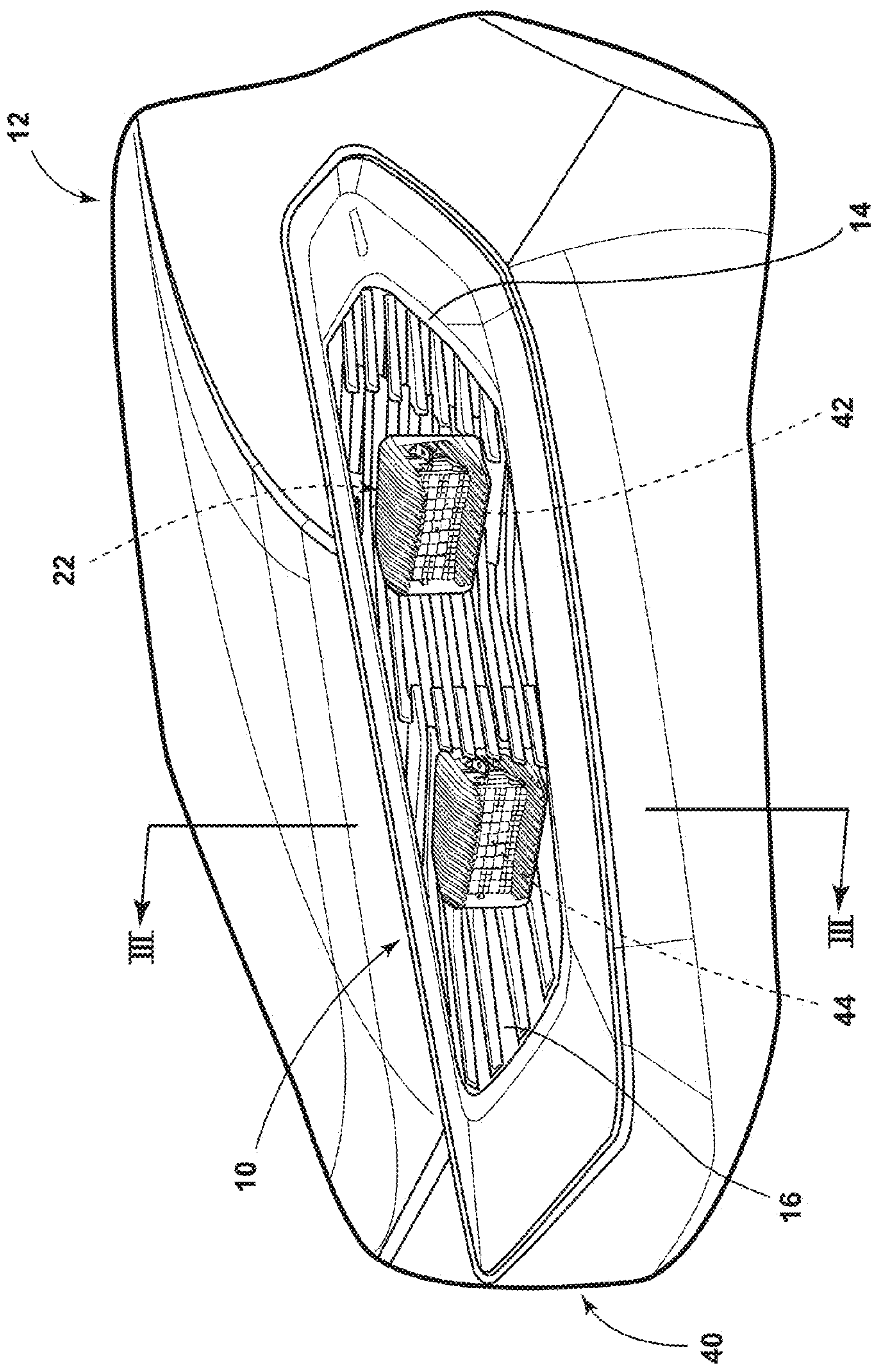
FIG. 2 is a detailed front perspective view of the headlight of the vehicle including the lighting element of FIG. 1.
Figure 3:
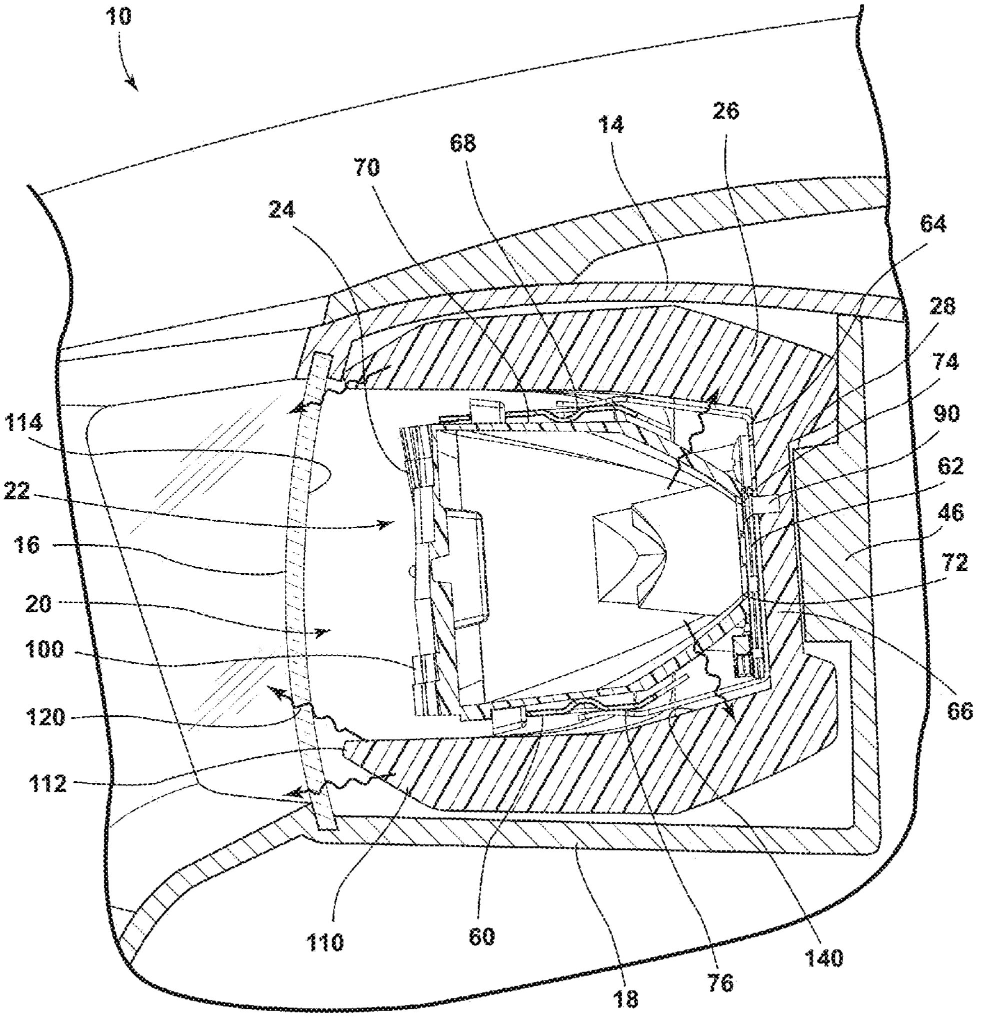
FIG. 3 is a cross-sectional view of the lighting element of FIG. 2 taken along line III-III.
Figure 4:
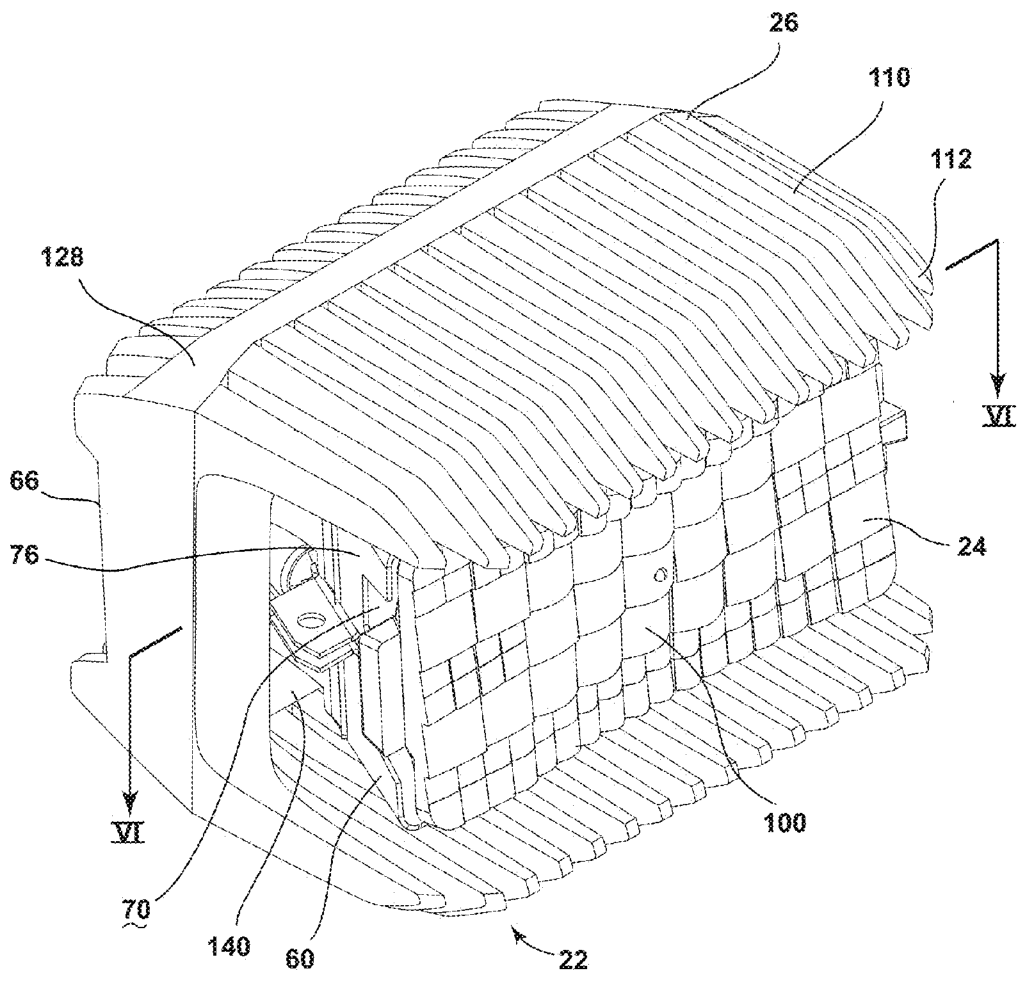
FIG. 4 is a perspective view of another embodiment of the vehicle lighting element.
Figure 5:
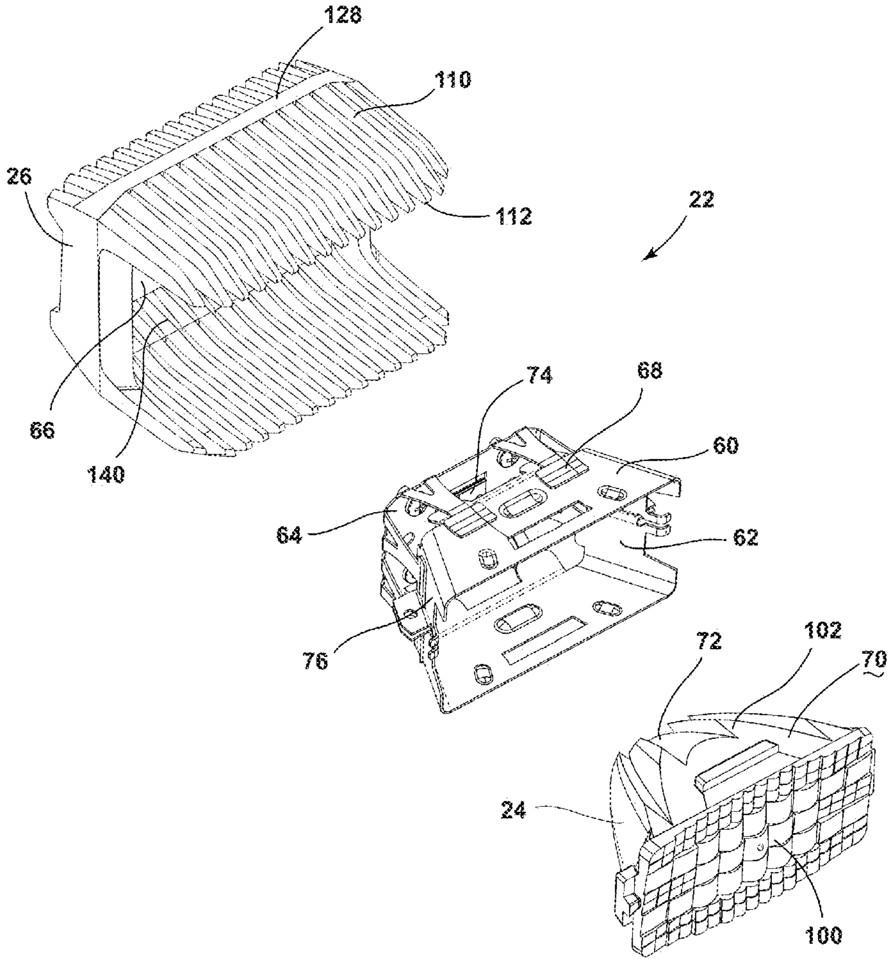
FIG. 5 is an exploded perspective view of the lighting element of FIG. 4.
Figure 6:
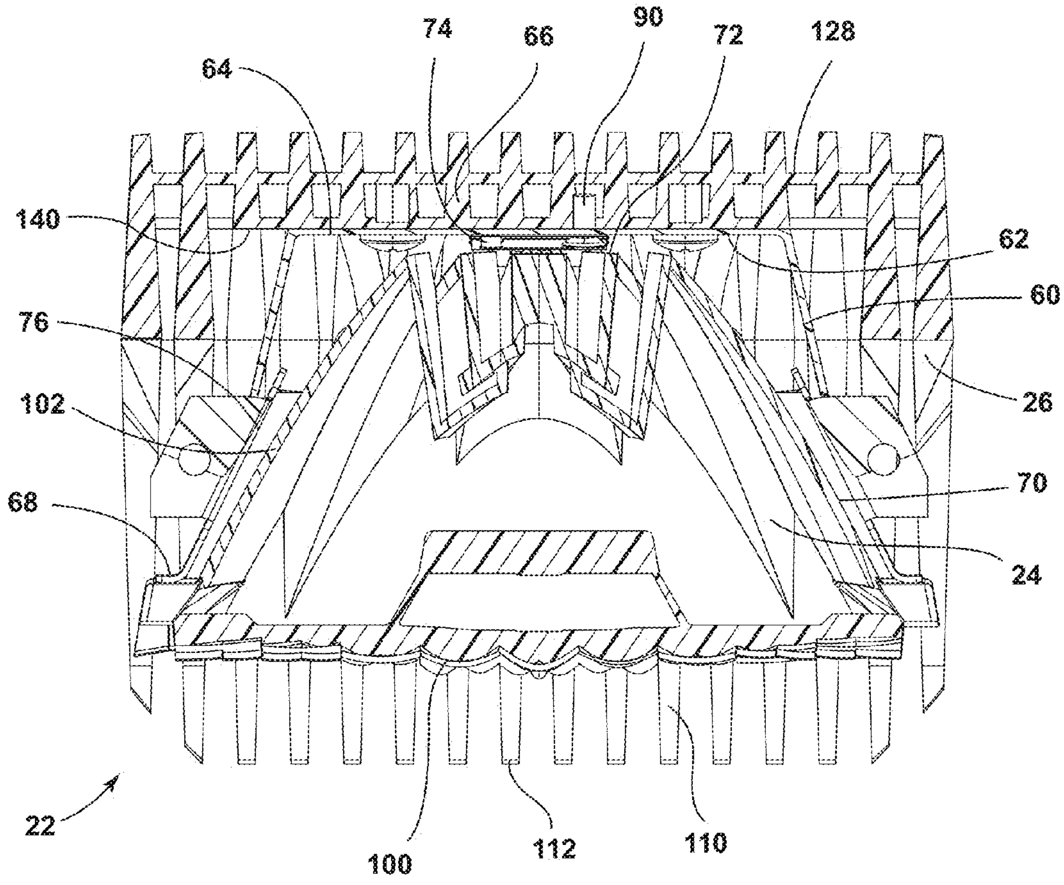
FIG. 6 is a cross-sectional view of the lighting element of FIG. 4, taken at line VI-VI.
Figure 7:
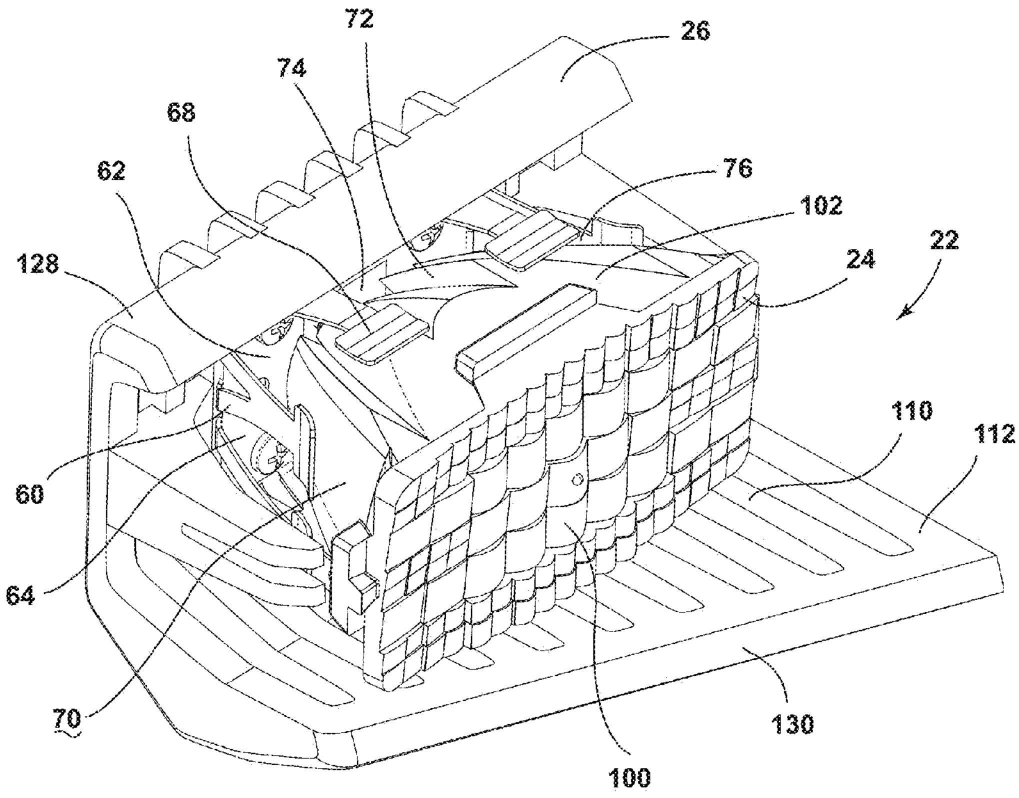
FIG. 7 is a top perspective view of another embodiment of the vehicle lighting element.
Figure 8:
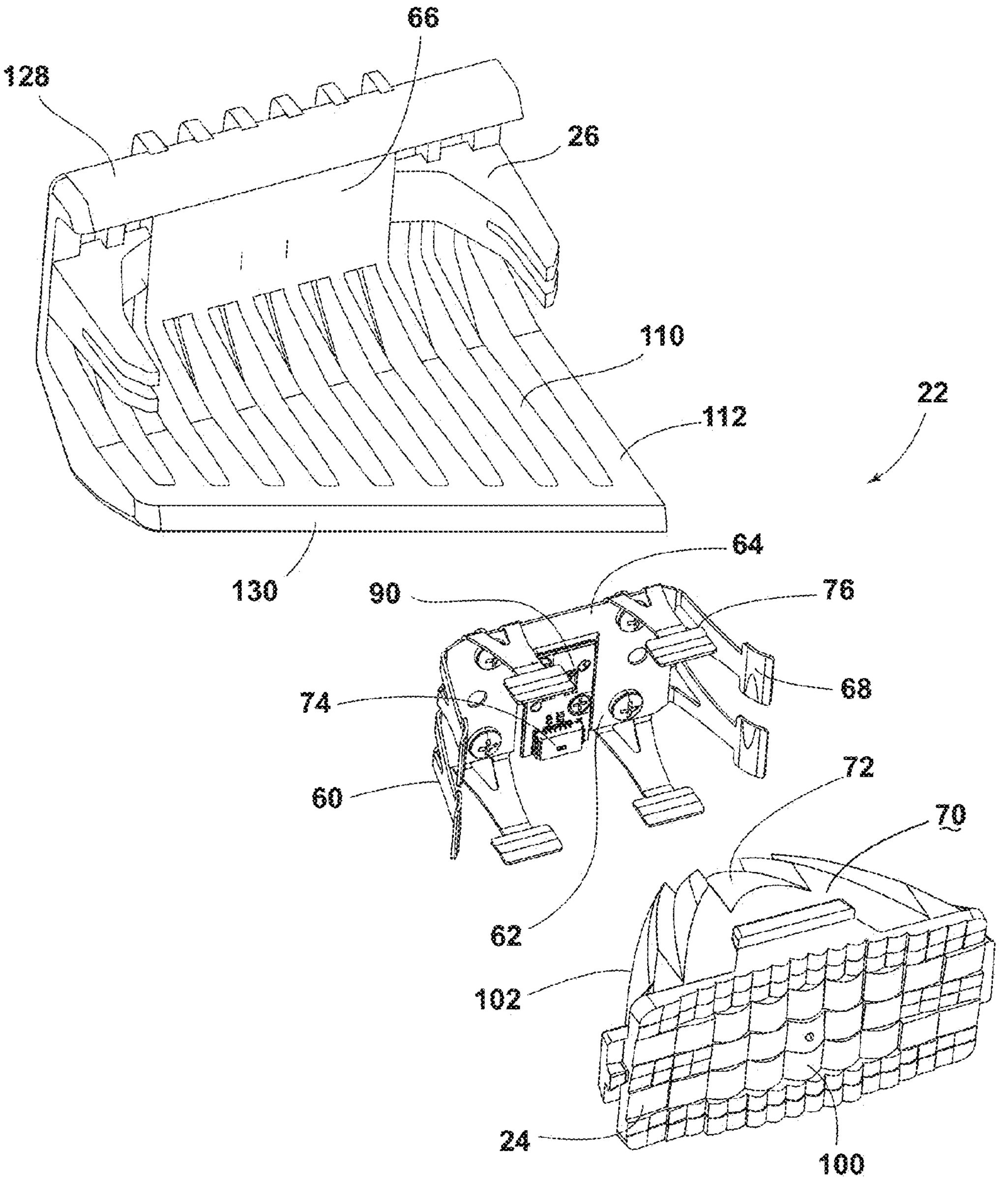
FIG. 8 is an exploded perspective view of the lighting element of FIG. 7.
Figure 9:
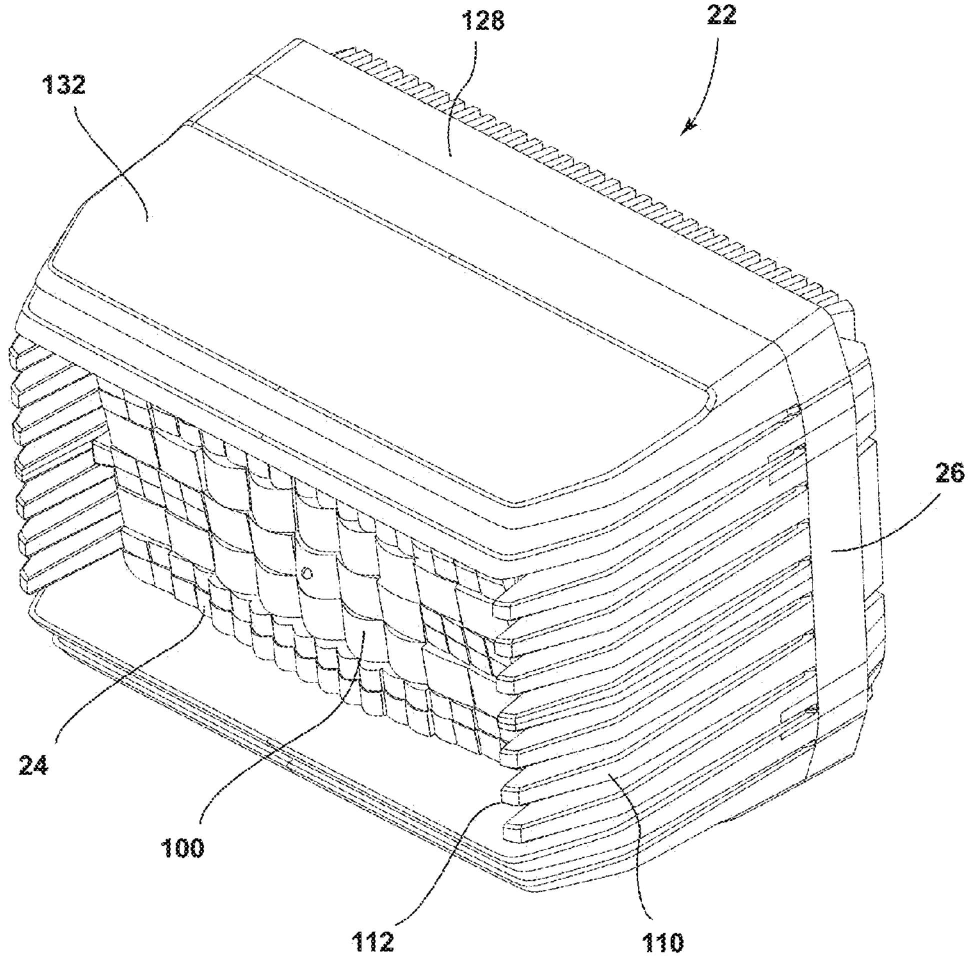
FIG. 9 is a top perspective view of another alternate embodiment of the vehicle lighting element.
Figure 10:
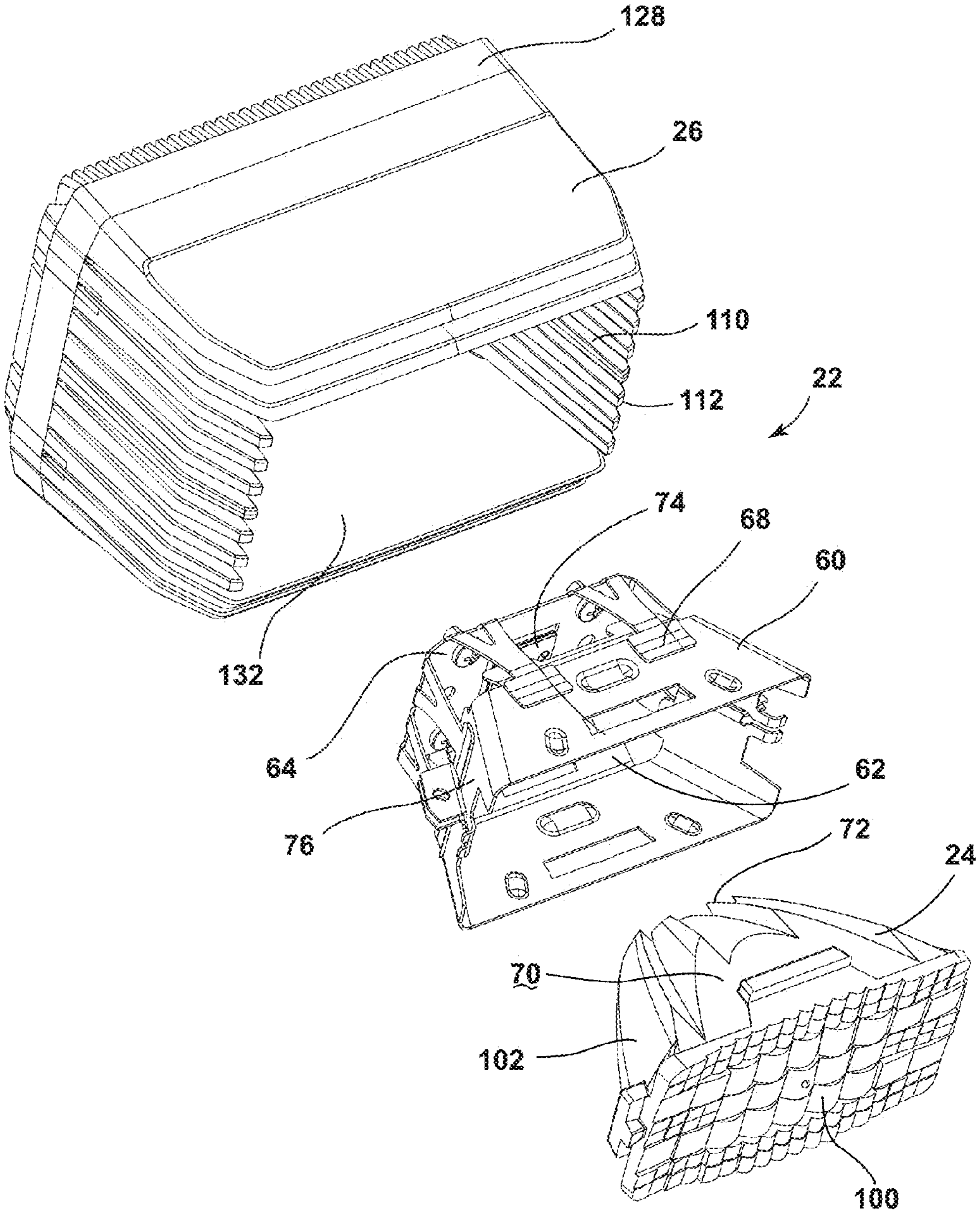
FIG. 10 is an exploded perspective view of the lighting element of FIG. 9.

As shown in FIGS. 1-3, reference numeral 10 generally refers to a headlight 10 for a vehicle 12. The headlight 10 includes a headlight housing 14 having an external lens 16 and an outer wall 18 that define a headlight interior 20. A lighting element 22 includes a light-emitting diode (LED) lamp 24 and an internal heatsink 26 coupled to at least a portion of the LED lamp 24. The LED lamp 24 is in thermal communication with the internal heatsink 26. The lighting element 22 is disposed within the headlight interior 20 and coupled to an element receptacle 28 defined by the outer wall 18. The internal heatsink 26 of the lighting element 22 is in thermal communication with the external lens 16.

Referring now to the embodiment illustrated in FIGS. 2 and 3, the headlight 10 is disposed within a front portion 40 of the vehicle 12 and can include one or more lighting elements 22. Where more than one lighting element 22 is included, typically, the headlight 10 will include a low-beam element 42 and a high-beam element 44. Each lighting element 22 can be coupled to the headlight housing 14 at the outer wall 18 or a rear wall 46 of the headlight housing 14. The exact connection method of the lighting element 22 to the headlight housing 14 within the headlight interior 20 can be determined, in part, by the geometry of the internal heatsink 26, the configuration of the headlight 10, the configuration of the LED lamp 24, as well as other considerations.

Referring now to the embodiment illustrated in FIGS. 3-6, the lighting element 22 can include a bracket 60 that is coupled to the internal heatsink 26, wherein the bracket 60 defines a lamp receptacle 62 configured to receive the LED lamp 24. It is contemplated that the LED lamp 24 can be removed from the lamp receptacle 62 for repair and/or replacement of the LED lamp 24. The bracket 60 can include a backplate 64, wherein the backplate 64 can be fastened, attached, or otherwise coupled to a back wall 66 of the internal heatsink 26. In the various embodiments, the bracket 60 can be attached to the internal heatsink 26 by mechanical fasteners that include, but are not limited to, screws, hooks, clasps, latches, and other similar fastening mechanisms. Other fastening methods for attaching the bracket 60 to the internal heatsink 26 can include adhesives, welding, and other similar methods. It is contemplated that the bracket 60 can include a plurality of tabs 68 that are configured to engage at least a portion of an outer surface 70 of the LED lamp 24. The tabs 68 of the bracket 60 are configured to position the LED lamp 24 such that a back portion 72 of the LED lamp 24 engages the electrical components 74 of the lighting element 22 and connections through which electricity can be connected to the LED lamp 24. The lighting element 22 is configured such that wiring and various electrical components 74 can be connected to the LED lamp 24 either through the back wall 66 of the internal heatsink 26 or through the bracket 60 to be delivered to the back portion 72 of the LED lamp 24. Alternatively, electrical wiring components can be delivered to the LED lamp 24 around the internal heatsink 26 and through side portions 76 of the bracket 60 for connection to the LED lamp 24. The exact location and path of the electrical components 74 can be determined, in part, by the configuration of the headlight 10, the configuration of the internal heatsink 26, the configuration of the LED lamp 24, and other considerations.

In various embodiments, the electrical components 74 for the LED lamp 24 is disposed on the backplate 64 of the bracket 60. The tabs 68 of the bracket 60 serve to position the back portion 72 of the LED lamp 24 having the electrical interface 90 of the LED lamp 24 in electrical engagement with the electrical components 74 of the bracket 60. It is also contemplated that the electrical components 74 can be disposed on a portion of the internal heatsink 26, such that the LED lamp 24 is installed in electrical engagement with the internal heatsink 26 when the LED lamp 24 is installed in the lamp receptacle 62.

In the various embodiments, the tabs 68 of the bracket 60 are configured to selectively retain the LED lamp 24 in an installed position, wherein the LED lamp 24 is placed in electrical communication with the various electrical components 74 and wiring for the headlight 10. In the event that an LED lamp 24 needs to be repaired and/or replaced, the LED lamp 24 can be removed from the bracket 60 manually, and without the use of tools. It is contemplated that various retaining structures in addition to, or other than, tabs 68 can be used to retain the LED lamp 24 within the lamp receptacle 62. Such retaining structures can include, but are not limited by, hooks, clasps, detents, protrusions, and other similar interference-type mechanisms. It is further contemplated that in various alternate embodiments, the LED lamp 24 can be mechanically fastened to the bracket 60 such that tools are required to remove and/or replace an LED lamp 24 within the lamp receptacle 62. It is further contemplated that in order to access the lighting element 22 within the headlight housing 14, the headlight housing 14 can be removed, or, the headlight housing 14 can include an access aperture through which the lighting element 22 can be accessed and removed for repair and/or replacement of the LED lamp 24. In the various embodiments, the headlight housing 14 can be configured such that user access to the headlight interior 20 for maintenance of the lighting element 22 can be accomplished manually, by hand, and without the use of tools. Alternatively, access to the headlight interior 20 can be configured such that tools are required in order to access the headlight interior 20 to maintain the lighting element 22.

Referring again to the embodiment as illustrated in FIGS. 3-6, the LED lamp 24 can include the back portion 72 and a lamp lens 100, where one or more lamp sides 102 extend between the back portion 72 and the lamp lens 100. The internal heatsink 26 includes a plurality of elongated members 110 that extend proximate at least a portion of the lamp sides 102 of the LED lamp 24. In the various embodiments, the elongated members 110 of the internal heatsink 26 can be configured to engage the LED lamp 24 proximate the back portion 72 of the LED lamp 24. In such an embodiment, the elongated members 110 of the internal heatsink 26 can extend from the back portion 72 of the LED lamp 24 to beyond the lamp lens 100 of the LED lamp 24. In this manner, each of the elongated members 110 of the internal heatsink 26 includes a distal end 112 that is positioned in front of the LED lamp 24 such that the distal end 112 of each elongated member 110 is disposed proximate an internal surface 114 of the external lens 16 of the headlight housing 14.

Referring again to the embodiment illustrated in FIGS. 3-6, as the headlight 10 of the vehicle 12 is being used, the LED lamp 24, while emitting light, also emits heat 120 from various portions of the LED lamp 24. In the various embodiments, heat 120 can be emitted from the lamp sides 102, the front, or other portion of the outer surface 70 of the LED lamp 24. As heat 120 is emitted from the LED lamp 24, the internal heatsink 26 captures at least a portion of this heat 120. The captured heat 120 is temporarily retained within the elongated members 110 of the internal heatsink 26. The captured heat 120 within the internal heatsink 26 migrates to areas around the lighting element 22 that have a lower temperature than the internal heatsink 26. Typically, the external lens 16 of the headlight housing 14 has a lower temperature than the internal heatsink 26 during operation of the headlight 10. This lower temperature of the external lens 16 is generally the result of the high temperature of the LED lamp 24, but can also be the result of environmental factors, such as air flowing across the external lens 16 during operation of the vehicle 12. The cooler temperature of the external lens 16 may also be the result of weather conditions such as rain, condensation, ice, snow, and other various weather conditions. Where inclement weather is present, in particular, condensation, snow and ice, the heat 120 that migrates from the LED lamp 24 through the internal heatsink 26 and to the distal ends 112 of each of the elongated members 110, can further migrate from the distal ends 112 of the elongated members 110 to the external lens 16 of the headlight housing 14. As such, the internal heatsink 26, after absorbing heat 120 from the LED lamp 24, exchanges or transfers heat 120 to cooler regions in and around the headlight housing 14, including the external lens 16. The internal heatsink 26, in this manner, serves as a heater to keep the external lens 16 clear of snow, ice, condensation, and other cold weather precipitation and accumulation. In this manner, the heat 120 transferred from the distal ends 112 of the elongated members 110 can serve to warm the external lens 16 above the freezing point of water to melt snow and ice that may collect on the outer surface 70 of the external lens 16. Also, the heat 120 transferred to the external lens 16 from the distal ends 112 of the elongated members 110 can serve to raise the temperature of the external lens 16 above the dew point of the surrounding air, such that condensation that may collect on the external lens 16 of the headlight housing 14 can dissipate, evaporate, or otherwise be removed from the surface of the external lens 16 as a result of the heat 120 from the elongated members 110 of the internal heatsink 26.

In the various embodiments, the elongated members 110 of the internal heatsink 26 can extend generally perpendicular from the back portion 72 of the internal heatsink 26. In such an embodiment, the elongated members 110 can be substantially linear, or can include various angled and/or curved portions that extend toward the distal ends 112 of each of the elongated members 110. It is contemplated that, in various embodiments, the elongated members 110 can extend in an angled configuration or a curved configuration, or both, relative to the back portion 72 of the internal heatsink 26. It is further contemplated that each elongated member 110 can have configurations that can include, but are not limited to, linear, curved, angled, trapezoidal, among other configurations. Additionally, various cross members 128 can be included that extend across the elongated members 110 to add structure to the elongated members 110 and also add surface area through which heat 120 can be transferred from the LED lamp 24 to areas outside of the lighting element 22, including the external lens 16. It is also contemplated that the elongated members 110 may not have a consistent length, but may have a length that substantially matches the profile of the headlight housing 14. Such configurations may include a triangular profile, a trapezoidal profile, a curved profile, an irregular profile, among other similarly shaped profiles. Various embodiments of the internal heatsink 26 may also include more than one row of elongated members 110, such as an inner layer and outer layer of elongated members 110 that extend around the perimeter of the LED lamp 24.

In the various embodiments, the internal heatsink 26 can be made of various materials that have a high thermal connectivity. Such materials can include, but are not limited to, aluminum, aluminum alloys, copper, composite materials that incorporate materials having a high thermal connectivity, combinations thereof, and other materials that are at least partially thermally conductive.

Referring now to the embodiments illustrated in FIGS. 7-10, the configuration of the elongated members 110 can be designed such that the elongated members 110 extend along only one side of the LED lamp 24. In various alternate embodiments, the elongated members 110 can extend along some or all of the sides of the LED lamp 24, such that the LED lamp 24 is substantially surrounded by a plurality of elongated members 110. It is further contemplated that the distal ends 112 of the elongated members 110 can be connected by an edge member 130, wherein the edge member 130 can add structure to the distal ends 112 of the elongated members 110 and also provide additional surface area through which heat 120 can be transferred from the LED lamp 24 to the external lens 16 of the headlight housing 14. The elongated members 110, in various embodiments, can include elongated plates 132 that extend across the length and width of a lamp side 102 of the LED lamp 24. In the various embodiments, the configuration of the elongated members 110 can be determined, in part, by the configuration of the headlight housing 14, the configuration of the LED lamp 24, the configuration of the front portion 40 of the vehicle 12, and other structural and aesthetic considerations.

In the various embodiments, it is contemplated that the lighting element 22 can be configured to exclude the bracket 60, such that the lamp receptacle 62 is defined within an inner portion 140 of the internal heatsink 26. In such an embodiment, the LED lamp 24 is coupled directly to the internal heatsink 26 and the internal heatsink 26 includes various tabbed features and/or interference members that are configured to selectively retain the LED lamp 24 within the internal heatsink 26. Additionally, various electrical components 74 that are configured to engage the LED lamp 24 and place the LED lamp 24 in electrical communication with the electrical system of the vehicle 12 can be disposed on a portion of the internal heatsink 26.

According to the various embodiments, the LED lamp 24 can be fixed to the internal heatsink 26, either by direct connection, or by connection through a bracket 60 that engages the LED lamp 24 to the internal heatsink 26. In such embodiments, replacement and/or repair of the LED lamp 24 can be accomplished through replacement of the entire lighting element 22, including the internal heatsink 26, the bracket 60 and the LED lamp 24.

It is contemplated that the lighting element 22 can include a generally rectangular configuration, wherein the LED lamp 24, the bracket 60 and the internal heatsink 26 can similarly include a generally rectangular shape. In various alternate embodiments, the lighting element 22 can include a generally curved configuration, wherein each component of the lighting element 22 is generally curved, circular, oval, elliptical, or other curved shape to generally match the shape of the headlight housing 14. It is also contemplated that the various components of the lighting element 22 can have dissimilar shapes, where one or more component is generally rectilinear and other components are generally curved.

Referring again to the embodiment illustrated in FIG. 1, it is contemplated, that in various embodiments, the lighting element 22 can be disposed within portions of the car other than the headlight 10. By way of explanation, and not limitation, an internal heatsink 26 can be disposed within a vehicle light fixture 150 or signal fixture 152, such as turn signals, parking lights, brake lights, fog lamps, and other various external light and signal fixtures 150, 152, where heat 120 may be transferred from an LED lamp 24 to an external lens 16 of a particular light and signal fixture 150, 152, in which the internal heatsink 26 is disposed. In the various embodiments, it is further contemplated that the internal heatsink 26 can be visible from the exterior of the vehicle 12 through the external lens 16 of the headlight housing 14. It is also contemplated that the heatsink 26, in addition to the functional elements disclosed above, can also include various aesthetic features that may add to the visual appeal of the headlight 10, light fixture 150 or signal fixture 152.

In the various embodiments, the lighting element can incorporate an LED lamp 24 or some other lighting source. These lighting sources can include any source that gives off light and heat that can be transferred by the internal heatsink 26 during use. Such sources include, but are not limited to, incandescent, halogen, metal halide, or other similar heat emitting light source.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle headlight comprising:

a headlight housing including an external lens and an outer wall that define a headlight interior; and a lighting element including a light-emitting diode lamp and an internal heatsink coupled to at least a portion of the lamp, wherein the lamp is in thermal communication with the internal heatsink, and wherein the lighting element is disposed within the headlight interior and coupled to an element receptacle defined by the outer wall, and wherein the internal heatsink of the lighting element is in thermal communication with the external lens, the internal heatsink defined by a plurality of parallel elongated members that extend continuously from a rear wall of the headlight housing and below the lighting element to an area between the lighting element and the external lens.

2. The vehicle headlight of claim 1, wherein the internal heatsink includes a bracket, and wherein the bracket defines a lamp receptacle configured to receive the lamp.

3. The vehicle headlight of claim 1, wherein the lamp includes a back portion, a lamp lens and at least one side surface that extends between the back portion and the lamp lens, and wherein the plurality of elongated members of the internal heatsink extend along at least a portion of the at least one side surface of the lamp.

4. The vehicle headlight of claim 2, wherein the lamp is selectively removable from the lamp receptacle.

5. The vehicle headlight of claim 3, wherein the elongated members engage the lamp proximate the back portion and extend from the back portion to beyond the lamp lens of the lamp.

6. The vehicle headlight of claim 3, wherein the at least one side surface includes a plurality of side surfaces, and wherein the elongated members of the heat sink extend in a parallel configuration that surrounds each at least one side surface of the lamp.

7. The vehicle headlight of claim 6, wherein the elongated members engage the lamp proximate the back portion and extend from the back portion to beyond the lamp lens of the lamp to an edge member that engages each distal end of the plurality of elongated members.

8. A vehicle headlight comprising:

a plurality of continuous parallel plates defining an internal heatsink for receiving a lamp, the lamp in thermal communication with the plates; and a housing including an external lens and an outer wall defining an interior volume, the internal heatsink and lamp disposed within the interior volume, and the parallel plates extending from a rear wall of the housing to a position proximate the external lens and in thermal communication therewith.

9. The vehicle headlight of claim 8, wherein the internal heatsink includes a bracket, and wherein the bracket defines a lamp receptacle disposed within the plates, and wherein the lamp is a light-emitting diode lamp.

10. The vehicle headlight of claim 9, wherein the lamp is selectively removable from the lamp receptacle.

11. The vehicle headlight of claim 9, wherein the lamp includes a back portion, a lamp lens and at least one side surface that extends between the back portion and the lamp lens, and wherein a portion of the plates include elongated members that extend in a parallel configuration around the entire lamp lens.

12. The vehicle headlight of claim 11, wherein the elongated members engage the lamp proximate the back portion and extend from the back portion to beyond the lamp lens of the lamp.

13. The vehicle headlight of claim 11, wherein the at least one side surface includes a plurality of side surfaces, and wherein the elongated members extend along each side surface of the lamp.

14. The vehicle headlight of claim 13, wherein the elongated members engage the lamp proximate the back portion and extend from the back portion to beyond the lamp lens of the lamp to an edge member that engages each respective distal end of the elongated members.

15. An external vehicle lamp comprising:

a heatsink defined by parallel plates, wherein a portion of the parallel plates define a lamp receptacle;

a lamp within the lamp receptacle and in thermal communication with the parallel plates; and a housing including a lens and an outer wall that define an interior volume, wherein the parallel plates and lamp are disposed within the interior volume and wherein the parallel plates are in thermal communication with the lens.

16. The external vehicle lamp of claim 15, wherein the heatsink includes a bracket, and wherein the bracket partially defines the lamp receptacle, and wherein the lamp is a light-emitting diode lamp that is selectively removable from the lamp receptacle.

17. The external vehicle lamp of claim 15, wherein the lamp includes a back portion, a lamp lens and at least one side surface that extends between the back portion and the lamp lens, and wherein the parallel plates engage the lamp proximate the back portion and extend from proximate the back portion to beyond the lamp lens of the lamp, and wherein the lamp is a light-emitting diode lamp.

18. The external vehicle lamp of claim 16, wherein the housing is a headlight housing.

19. The external vehicle lamp of claim 16, wherein the housing is a signal fixture.

20. The external vehicle lamp of claim 17, wherein the at least one side surface includes a plurality of side surfaces, and wherein the parallel plates extend along each side surface of the lamp and beyond the lamp lens.

* * * * *